No. 674,871. Patented May 28, 1901.
G. Y. McMURRY.
THILL OR TONGUE COUPLING FOR VEHICLES.
(Application filed Jan. 19, 1901.)
(No Model.)
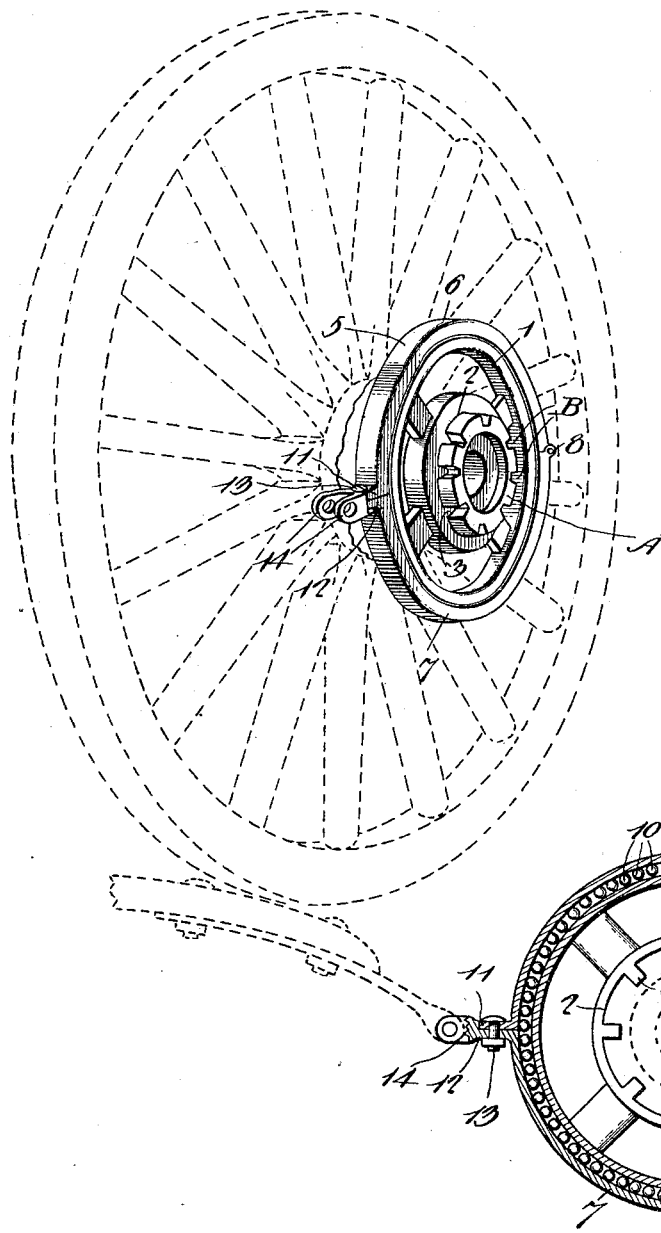
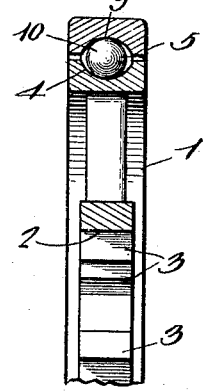
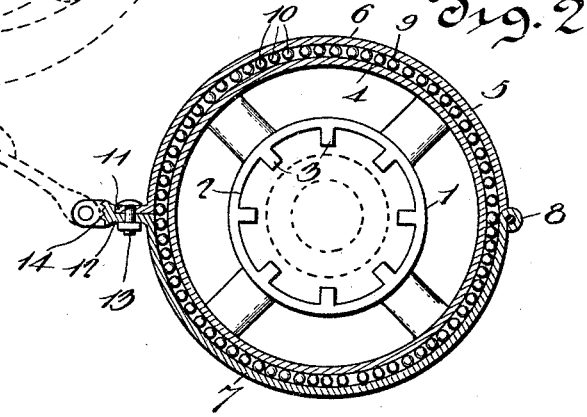
Witnesses
Graves Y. McMurry, Inventor.
By C. A. Snow & Co.
Attorneys
THE NORRIS PETERS CO., PHOTO-LITHO., WASHINGTON, D. C.

UNITED STATES PATENT OFFICE.

GRAVES YANCY McMURRY, OF SILVER CITY, GEORGIA.

THILL OR TONGUE COUPLING FOR VEHICLES.

SPECIFICATION forming part of Letters Patent No. 674,871, dated May 28, 1901.

Application filed January 19, 1901. Serial No. 43,931. (No model.)

*To all whom it may concern:*

Be it known that I, GRAVES YANCY MC-MURRY, a citizen of the United States, residing at Silver City, in the county of Forsyth and State of Georgia, have invented a new and useful Thill or Tongue Coupling for Vehicles, of which the following is a specification.

My invention is an improved thill or tongue coupling for vehicles, the object of which is to provide means for attaching the thills or tongue directly to the hubs of the front wheels instead of to the front axle, as heretofore, and to lighten the draft of the vehicle.

My invention consists in the peculiar construction and combination of devices hereinafter described and claimed.

In the accompanying drawings, Figure 1 is a perspective view of my thill or tongue coupling, showing the same mounted in operative position on the inner end of the hub of a vehicle-wheel. Fig. 2 is a detail sectional view of the same, taken on a plane intersecting the ball-race. Fig. 3 is a detail transverse sectional view of the same, taken on a plane at right angles to that of Fig. 2.

In the embodiment of my invention I provide the inner portion of the hub A of a vehicle-wheel with a series of grooves B, which are disposed parallel with the axis of the hub. A disk or circular plate 1 of suitable dimensions is adapted to fit on the inner portion of the wheel-hub, being provided with a central opening 2 to receive the same and having a series of radial tongues 3, which are adapted to enter the grooves B of the hub and thereby secure said disk to the hub and cause the same to rotate with the wheel. A groove 4 of suitable depth and shape is made in the periphery of the disk 1 and is circumferential thereof. A circular strap 5, which is formed of two sections 6 7, hinged together, as at 8, is fitted on the disk, the latter revolving therein, and said strap is provided on its inner side with an annular groove 9, which is similar to the annular groove 4, with which the disk is provided. Said grooves 4 and 9 form a ball-race between the opposing surfaces of said disk and strap, and in the said race are a series of bearing-balls 10, which reduce friction between the disk and the strap, as will be understood. The meeting end of the sections 6 7 of the strap are provided, respectively, with outwardly-projecting arms 11 12, secured together by a bolt 13 or any other suitable means. The arm 12 is bifurcated at its outer end to form a pair of ears 14, having an opening through them to receive a pivotal bolt and adapted for the attachment of a thill-iron or tongue-iron thereto, the said bifurcated arm 12 forming one element of a thill or tongue coupling, as will be understood, and thereby adapting the thills or tongue of a vehicle to be coupled directly to the hubs of the front wheels thereof instead of to the front axle, as heretofore.

By means of my improved coupling the draft is applied directly to the wheels instead of indirectly to the wheels through the front axle, and thereby the power of the draft-animal is exerted directly on the wheels, with a consequent lightening of the draft.

I do not desire to limit myself to the precise construction and combination of devices herein shown and described, as it is evident that modifications may be made therein without departing from the spirit of my invention.

Having thus described my invention, I claim—

1. A vehicle-wheel having a thill or tongue coupling directly on the hub thereof, substantially as described.

2. A vehicle-wheel having a disk secured to and revoluble with the hub thereof, a strap engaging said disk and in which the latter rotates and means to couple a thill or tongue iron directly to said strap, substantially as described.

3. The combination with a vehicle-wheel, of a disk secured to and revoluble with the hub thereof, a strap in which said disk rotates, said disk and strap having a ball-race formed in their opposing sides, bearing-balls in the said ball-race, and means to couple a thill or tongue iron to said strap, substantially as described.

In testimony that I claim the foregoing as my own I have hereto affixed my signature in the presence of two witnesses.

GRAVES YANCY McMURRY.

Witnesses:
J. R. ECHOLS,
S. H. ALLEN.